Figure 1:
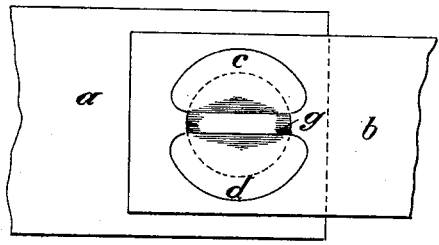

No. 628,239. Patented July 4, 1899.
G. COHN.
HINGE JOINT FOR FLAT ARTICLES.
(Application filed Dec. 3, 1898.)

(No Model.)

WITNESSES:
M. H. Wentzel
George Geibel.

INVENTOR
Georg Cohn
BY
Francis Raegener
ATTORNEYS.

UNITED STATES PATENT OFFICE.

GEORG COHN, OF BRESLAU, GERMANY.

HINGE-JOINT FOR FLAT ARTICLES.

SPECIFICATION forming part of Letters Patent No. 628,239, dated July 4, 1899.

Application filed December 3, 1898. Serial No. 698,156. (No model.)

*To all whom it may concern:*

Be it known that I, GEORG COHN, chromolithographic artist, a subject of the Emperor of Germany, residing at 3a Königsplatz, Breslau, Germany, have invented certain new and useful Improvements in Hinge-Joints for Flat Articles, (for which I have made application for patent in Germany, filed May 13, 1898,) of which the following specification, taken and read with the drawings to accompany this, is a full, clear, and exact description.

This invention relates to certain improved hinge-joints for flat articles, and in the drawings various applications of the invention are represented.

Figure 2:
Figure 2:
Figure 2:
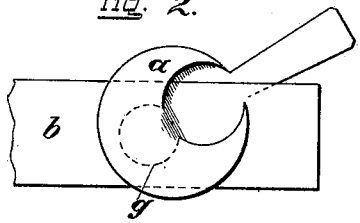

Figure 1 is a plan of the under side of such a joint or attachment means, and Fig. 2 shows the parts disengaged.

$a$ $b$ represent two flat bodies connected together in such wise that there will be a certain mobility or allowance of movement between the two bodies, so that there is rendered possible a partial turning each upon the other. In the flat body $a$ cuts are made, so as to leave the flaps $c$ $d$ attached to $a$ at the lines $e$ $f$, Fig. 1$^a$. The other flat body $b$ has a cut-out portion or opening $g$ provided therein. To form the connection between the bodies $a$ $b$, the flaps $c$ $d$ are bent up, so that the end of the body $a$ at that part can be passed into the opening $g$, and the flaps $c$ $d$ are turned up by bending over together, so as to be capable of being passed into and through the cut-out portion $g$ of the body $b$, after which the flaps $c$ $d$ are again turned down into flat position, so securing the flat bodies $a$ $b$ together. The size of the opening $g$ is such that when the flaps $c$ $d$ have been passed through it and laid down flat they cannot be withdrawn, but permit a turning of the parts $a$ $b$ one upon the other.

It is not in all cases necessary to cut two flaps in the body $a$, as last described; but, as shown in Fig. 2, it will suffice to cut but one such flap $c'$, which is to be bent up, passed through an aperture $g$ of the body $b$, and then flattened down. Fig. 2$^a$ shows parts similar to $a$ $b$ of Fig. 2 disconnected.

So far the part $b$, as shown, can be turned completely around in a circle. If, however, the part of the body $b$ which previously covered the opening $g$ is not quite cut out, but be left attached at one point, as at $g'$, Figs. 3 and 3$^a$, the movement of turning of the parts $a$ $b$ relatively to each other will be limited. The turning of the parts under such conditions can only be affected so far as that the incision-line $c^2$ of the flaps $c'$, Fig. 3$^a$, are brought to lie against the incision-line $g'$ of the part $b$. Any form admitting only of such restricted motion can be given to the flap $c'$ and, corresponding to it, to the cut-out orifice $g$. As shown in Fig. 4, the cut-out part $g$ is of oval form, while the flaps $c'$ have a circular curved form.

Fig. 4$^a$ shows the parts $a$ $b$ separate, and Fig. 4$^b$ is a longitudinal section of the parts, taken through the jointing connections. The said described connections are characterized by the facts that from the body $a$ one or more flaps are cut out, but not fully so, and these so-attached flaps of body $a$ are bent up and passed through a cut-out orifice of smaller area in another body $b$, and when the flap or flaps $a$ are again laid down they will cover a larger area than the orifice of the body $b$. By these means a sidewise motion is given to the part $a$ in relation to the part $b$ and at the same time a turning motion of the two bodies together.

If the cutting of the orifice $g$ be not made completely, the area of metal thereof will remain attached, and the turning motion of the parts $a$ and $b$ relatively will be restricted thereby to a certain corresponding degree. The flaps of body $a$ and the cut-out portions are of any, but of corresponding, form as described and illustrated.

Figure 3:
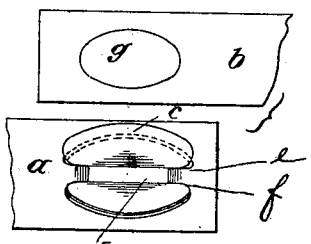
Figure 3:
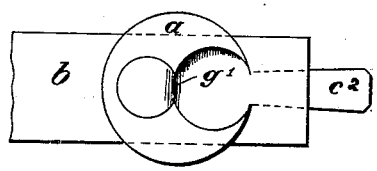
Figure 4:
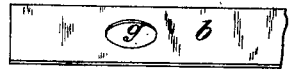
Figure 4:
Figure 4:
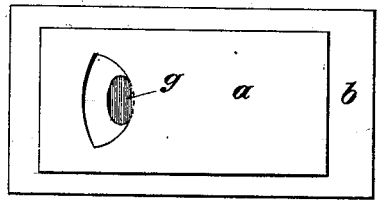
Figure 5:
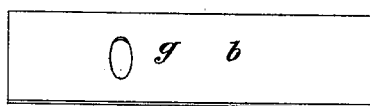
Figure 5:
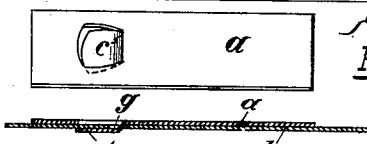
Figure 5:

Referring to Figs. 2 and 3, there is presented a further property—that is to say, the cut flap $c'$ is provided with an arm or prolongation $c^2$. This prolongation $c^2$ will serve as a handle for giving motion of the body $a$ relatively to the body $b$. These connections can, for example, be employed advantageously in the construction of figures which have movable parts, such as for fastening arms or limbs to figures or other like movable parts to the body. In Fig. 5 of the annexed drawings is shown such a figure with jointed limbs that can be turned either way.

I claim—

1. The combination with a flat body provided with an orifice, of another flat body provided with a flap inserted through said orifice, said bodies lying flat together, and being, by the so-constructed joint adapted to turn the one on the other, substantially as set forth.

2. The combination with a flat body provided with a round orifice, of another flat body provided with a flap struck up therefrom and inserted through said orifice, said bodies lying flat together and being adapted to turn the one on the other, substantially as set forth.

3. The combination with a flat body provided with an orifice, of another flat body provided with a flap inserted through said orifice, said bodies lying flat together and one of them having a projecting handle whereby it is adapted to be turned upon the joint made by said orifice and flap, substantially as set forth.

In witness whereof I have hereunto set my hand in presence of two witnesses.

GEORG COHN.

Witnesses:
WILHELM WEIDNER,
HERMANN BARTSCH.